United States Patent
Zhang

(10) Patent No.: US 8,529,079 B2
(45) Date of Patent: Sep. 10, 2013

(54) BACKLIGHT MODULE AND HEATING DEVICE THEREOF

(75) Inventor: Pangling Zhang, Guangdong (CN)

(73) Assignee: Shenzhen China Star Optoelectronics Technology Co. Ltd, Shenzhen Guangdong (CN)

( * ) Notice: Subject to any disclaimer, the term of this patent is extended or adjusted under 35 U.S.C. 154(b) by 0 days.

(21) Appl. No.: 12/997,914

(22) PCT Filed: Nov. 2, 2010

(86) PCT No.: PCT/CN2010/078356
§ 371 (c)(1),
(2), (4) Date: Dec. 14, 2010

(87) PCT Pub. No.: WO2012/012977
PCT Pub. Date: Feb. 2, 2012

(65) Prior Publication Data
US 2012/0182716 A1    Jul. 19, 2012

(30) Foreign Application Priority Data
Jul. 29, 2010 (CN) .......................... 2010 1 0245367

(51) Int. Cl.
*G09F 13/04* (2006.01)
(52) U.S. Cl.
USPC ........................................ 362/97.1; 362/263
(58) Field of Classification Search
USPC ............... 362/97.1–97.4, 224, 225, 221, 260, 362/263, 264
See application file for complete search history.

(56) References Cited

U.S. PATENT DOCUMENTS

| 5,079,681 A * | 1/1992 | Baba et al. ..................... 362/263 |
| 5,767,934 A | 6/1998 | Goddard |
| 7,169,005 B2 * | 1/2007 | Hayashi et al. ................. 445/26 |
| 2007/0115686 A1 * | 5/2007 | Tyberghien ................... 362/580 |

FOREIGN PATENT DOCUMENTS

| CN | 1178894 A | 4/1998 |
| CN | 2622732 Y | 6/2004 |
| CN | 1532784 A | 9/2004 |
| CN | 1867219 A | 11/2006 |
| JP | 2201804 A | 8/1990 |
| JP | 3078904 A | 4/1991 |
| JP | 3113480 A | 5/1991 |
| JP | 7043680 A | 2/1995 |
| JP | 11039915 A | 2/1999 |
| JP | 11306832 A | 11/1999 |

* cited by examiner

*Primary Examiner* — Bao Q Truong
(74) *Attorney, Agent, or Firm* — Mark M. Friedman

(57) ABSTRACT

The present invention discloses a backlight module, comprising a back plate, a reflection plate, a cold cathode fluorescent lamp (CCFL), an optical film, a panel and a front frame, wherein the backlight module further comprises a heating device, and the heating device is disposed between the reflection plate and the CCFL. When the backlight module of the present invention is used in a cold area, the heating device is electrically powered in advance to generate heat and to heat the CCFL, and temperature of the CCFL can be raised to a normal initiation temperature which is above ten degrees below zero. Accordingly, the CCFL can avoid usage of over-power voltages in low temperature initiation thereof, and the life of the CCFL is less affected.

5 Claims, 2 Drawing Sheets

BACKLIGHT MODULE AND HEATING DEVICE THEREOF

BACKGROUND OF THE INVENTION

1. Field of the Invention

The present invention relates to a backlight module, particularly to a backlight module which comprises a heating device and is capable of working normally in a condition of low temperature, and relates to the technical filed of liquid crystals.

2. Related Art

Liquid crystal (LC) is a state of matter between liquids and crystals. The principle of displaying of the liquid crystal is based on the fact that molecular arrangement of the liquid crystal can be altered by applying different voltages to the liquid crystal, and therefore the quantity of light passing through the liquid crystal is controlled in order to display various kinds of images. However, the liquid crystal does not radiate light itself. Instead, it can only control passing of light, and therefore all of liquid-crystal panels need backlight sources for illumination.

Currently, most of the liquid-crystal panels are equipped with a Cold Cathode Fluorescent Lamp (CCFL) as their backlight source. The CCFL is regarded as an ideal backlight source for the liquid-crystal panels because it has advantages of having a tiny, slim lamp tube, simple structure, low surface temperature on the lamp tube, easily processing and forming, good color presentation, uniform light emission, etc.

The CCFL is a closed gas discharge tube. Two ends of the lamp tube of the CCFL are cold cathodes made of metals like nickel, tantalum, zirconium, and so on. Such cold cathodes are electrodes that are capable of emitting electrons directly without being heated. The lamp tube of the CCFL is mainly filled with inert gas, argon, and a small amount of neon and krypton both used as a catalyst for electrical discharge. Besides, a small amount of mercury vapor is also filled in the lamp tube. In the condition of low temperature, because mercury in the lamp tube of the CCFL volatilizes slowly, pressure of the mercury vapor is not high enough and mercury ions in the lamp tube is quite limited in number so as to affect initiation and light emission of the CCFL. Accordingly, initiation voltage and light-emission brightness of the CCFL relate to temperature of the environment where the CCFL is located.

Nowadays, two main reliable methods to improve the low temperature property of the lamp tube of the CCFL are as follows. The first method is preheating via an external heating source. For instance, in a well-known method of heating a liquid crystal display (LCD) module, a layer of a semiconductor film, indium tin oxide (ITO) film, is deposited on a high-intensity special glass base by means of vacuum evaporation or magnetron sputtering, and the layer of the deposited film becomes crystal-clear transparent and has certain electrical conductivity after professional processing. A heater inside the LCD module is therefore made by utilizing its electrical conductivity. However, the aforesaid method has drawbacks of complicated processing, difficult assembly and having a low yield rate. The second method is applying over-power voltages to the LCD module when the LCD module initiates in low temperature so as to raise temperature of the lamp tube of the CCFL rapidly and facilitate mercury being volatilized to mercury vapor fast in order to realize the fast initiation purpose of the lamp tube of the CCFL. However, the aforesaid second method might affect the life of the lamp tube of the CCFL and therefore is not really an ideal solution.

SUMMARY OF THE INVENTION

To overcome problems in the existing arts, a major object of the present invention is to provide a backlight module which comprises a heating device and is capable of initiating normally in an environment of low temperature.

The second object of the present invention is to provide a heating device adapted for a backlight module.

To achieve the above objects, the present invention utilizes following technical solutions:

A backlight module comprises a back plate, a reflection plate, a cold cathode fluorescent lamp (CCFL), an optical film, a panel and a front frame, wherein the backlight module further comprises a heating device, and the heating device is disposed between the reflection plate and the CCFL.

In one embodiment of the present invention, the heating device is a transparent film electrical heater.

In another embodiment of the present invention, the transparent film electrical heater comprises three layers, wherein upper and lower layers of the three layers are made of transparent insulating material, and a middle layer of the three layers is a carbon fiber heating structure.

In another embodiment of the present invention, the backlight module further comprises a temperature control device, and the temperature control device comprises a temperature control switch circuit and a plurality of thermocouples, wherein the plurality of thermocouples are installed at a location of the CCFL, and the temperature control switch circuit is electrically connected with a power supply apparatus of the heating device.

In another embodiment of the present invention, the heating device is tightly attached to the CCFL and fixed onto the reflection plate by adherence.

Moreover, the present invention provides a heating device adapted for a backlight module, and the heating device is the above mentioned transparent film electrical heater which is disposed between the reflection plate and the cold cathode fluorescent lamp (CCFL) of the backlight module.

When the backlight module with the heating device of the present invention is used in a cold area, the heating device is electrically powered in advance to generate heat and to heat the CCFL, and temperature of the CCFL can be raised to a normal initiation temperature which is above ten degrees below zero. Accordingly, the CCFL can avoid usage of over-power voltages in low temperature initiation thereof, and the life of the CCFL is less affected.

DESCRIPTION OF THE PREFERRED EMBODIMENTS

Figure 1:
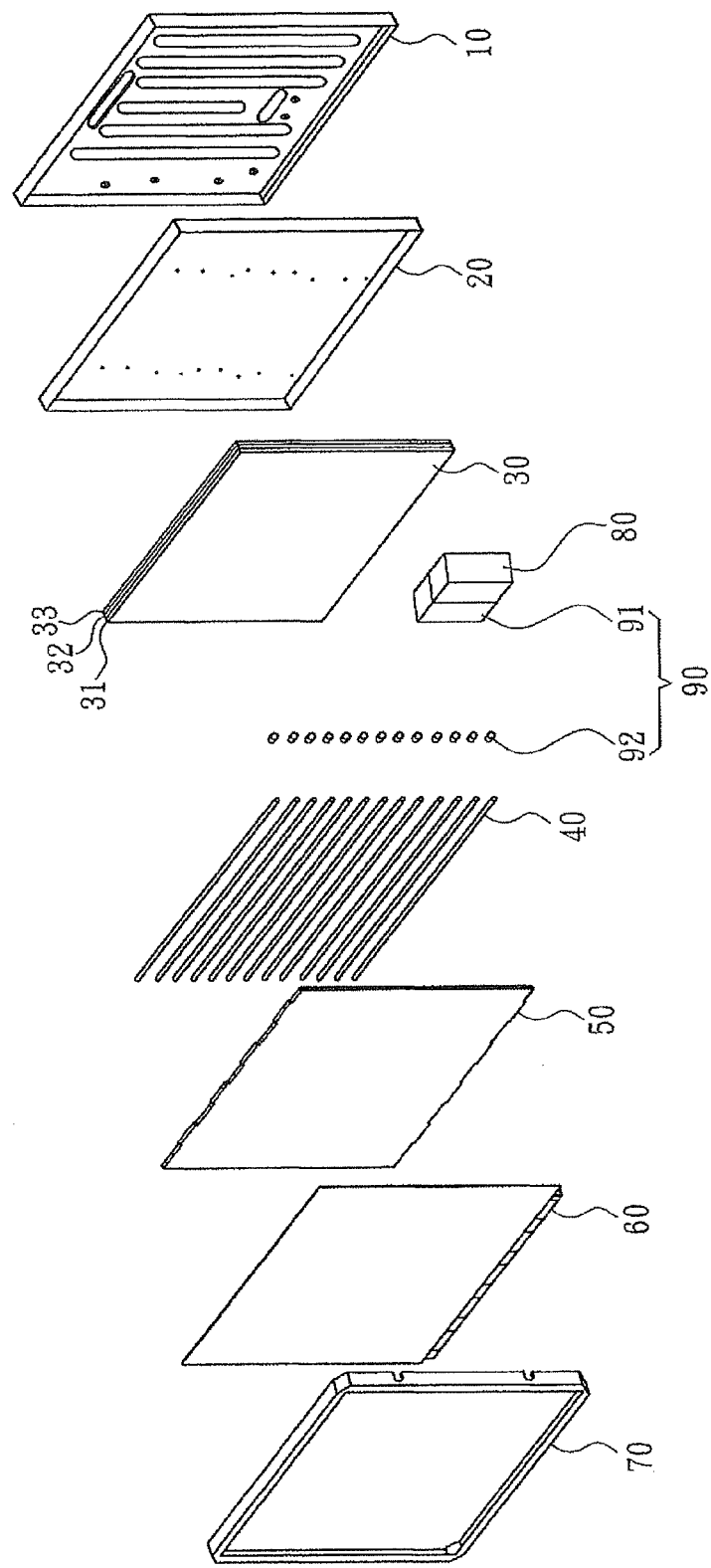
FIG. 1 is an exploded view showing a backlight module having a heating device of the present invention.

To more clearly set forth the above-mentioned objects, features and advantages of the present invention, preferable embodiments of the present invention are given below in combination with drawings for a detailed description as below. Furthermore, directional terms described in the present invention, such as 'up', 'down', 'front', 'rear', 'left', 'right', 'inside', 'outside', 'side' and so on, are merely referred to directions shown in the drawings. Accordingly, the directional terms are used for describing and explaining the present invention, not used for restricting the present invention.

A core technical concept of the present invention is to dispose a heating device inside a backlight module. The heating device is packaged with a panel, a back plate, a reflection plate, etc, of the backlight module as a whole unit, and is tightly attached to a cold cathode fluorescent lamp (CCFL) of the backlight module. In an environment of low temperature, the heating device is capable of generating heat to heat the cold cathode fluorescent lamp. Accordingly, the CCFL can avoid initiation thereof in a condition of lower temperature. The below is a further description in combination with FIG. 1 and FIG. 2.

FIG. 1 is an exploded view showing a backlight module having a heating device of the present invention. The backlight module mainly comprises the below constitutive parts including a back plate 10, a reflection plate 20, a transparent film electrical heater 30, a cold cathode fluorescent lamp (CCFL) 40, an optical film 50, a panel 60, and a front frame 70. In assembly of the backlight module, the back plate 10, the reflection plate 20, the transparent film electrical heater 30, the CCFL 40, the optical film 50, the panel 60 and the front frame 70 are stacked together in order and assembled as a whole unit of the backlight module, wherein the transparent film electrical heater 30 is disposed between the reflection plate 20 and the CCFL 40.

Installation of the transparent film electrical heater 30 is a major technical feature of the backlight module of the present invention. In assembly of the backlight module, the transparent film electrical heater 30 is attached to a bottom of the CCFL 40, and then is fixed to the reflection plate 20 at a bottom of the transparent film electrical heater 30 by adherence via thermosetting adhesive or high-temperature optical adhesive. By doing so, when the backlight module is situated in a low temperature environment under ten degrees below zero, the transparent film electrical heater 30 is firstly electrically powered, and generated heat of the transparent film electrical heater 30 is used to preheat the CCFL 40 above the transparent film electrical heater 30 in order to heat the CCFL 40 to reach a temperature range for normal initiation of the CCFL 40.

Differing from any electrical heater of the existing technology which is mostly wound and made by copper-nickel alloy, the transparent film electrical heater 30 of the present invention comprises three layers, wherein upper 31 and lower layers 33 of the three layers are made of transparent insulating material and a middle layer 32 of the three layers 31, 32, 33 is a carbon fiber heating structure. The principle of carbon fiber heating is stated that heat is generated due to mutual collision and friction of electrons when the electrons pass through thermo-elements and perform "Brownian motion" under induction and excitement of electricity. Hence, electrical-thermal energy conversion rate can reach 99.99% and above. Within a couple of ten seconds after electrically powering, surface temperature of the carbon fiber heating structure raises rapidly, and thermal energy is transmitted to the transparent insulating material covering surfaces of the carbon fiber heating structure so as to continuously raise surface temperatures of the upper and lower layers 31 of the transparent insulating material and to effectively and quickly heat the CCFL 40. Another advantage of using the carbon fiber heating structure in the transparent film electrical heater 30 is that carbon fiber is structurally soft and difficult to be broken so as to have a longer usage life.

Figure 2:
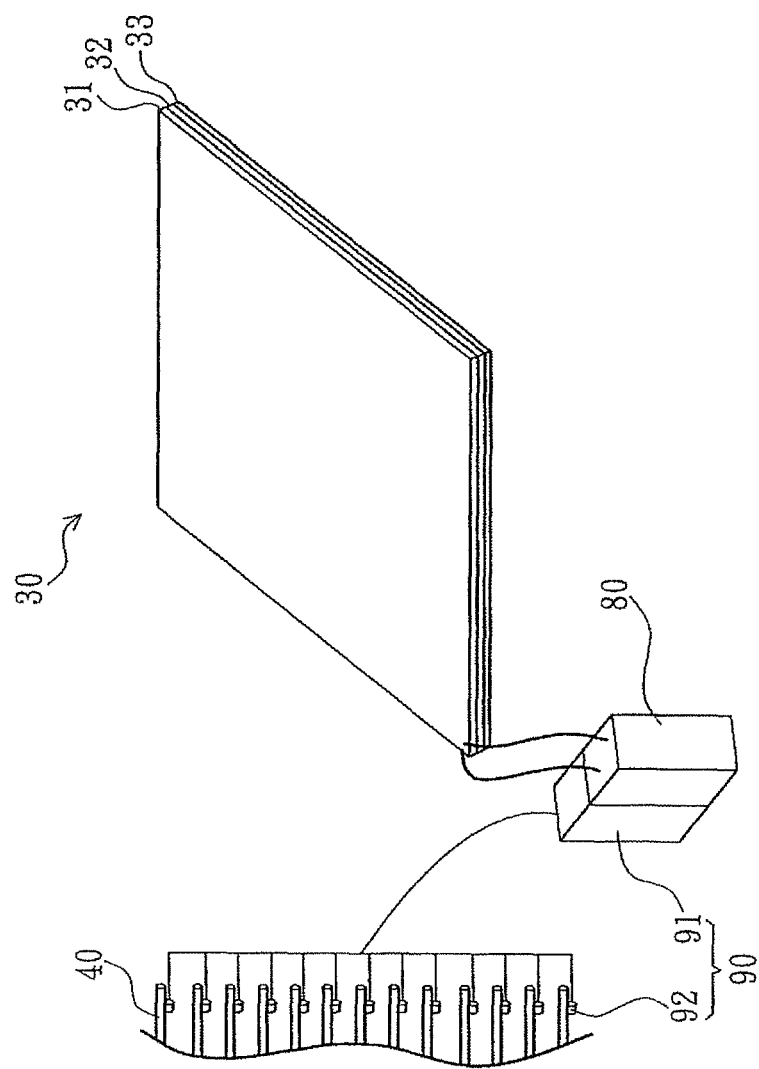
FIG. 2 is a schematic view showing a transparent film electrical heater used as the heating device.

FIG. 2 illustrates the transparent film electrical heater 30 used in the backlight module of the present invention. The transparent film electrical heater 30 comprises a film body and a power supply apparatus 80, and is electrically connected to power by conductive wires.

To reduce energy consumption and prevent the CCFL 40 from extra high temperature, it is preferably to install a temperature control device 90 to the backlight module. The temperature control device 90 comprises a temperature control switch circuit 91 and a plurality of thermocouples 92, wherein the plurality of thermocouples 92 are installed at a location of the CCFL 40 in order to collect temperature data of the CCFL 40 in real time. The collected temperature data are transmitted to the temperature control switch circuit 91. Besides, the temperature control switch circuit 91 is electrically connected with the power supply apparatus 80 of the transparent film electrical heater 30. When the temperature of the CCFL 40 is lower than its normal initiation temperature (above ten degrees below zero), the temperature control switch circuit 91 turns on the power supply apparatus 80 of the transparent film electrical heater 30 to start preheating of the transparent film electrical heater 30, and therefore heat the CCFL 40 to a temperature range of normal initiation thereof. On the other hand, while the temperature of the CCFL 40 is higher than its normal initiation temperature (above ten degrees below zero), preheating is no longer required, and the temperature control switch circuit 91 automatically cuts off the power supply apparatus 80 of the transparent film electrical heater 30 to avoid unnecessary power consumption. The temperature control switch circuit 91 as mentioned above is similar to a temperature control circuit of an electrically thermal blanket. Such usual designs can be made by ordinary technical persons skilled in this technical area, and thus are not described in detail herein.

As described above, when the backlight module having the heating device of the present invention is used in a cold area, the heating device is electrically powered in advance to generate heat and to heat the CCFL 40 and temperature of the CCFL 40 can be raised to a normal initiation temperature which is above ten degrees below zero. Accordingly, the backlight module can avoid usage over-power voltages in low temperature initiation thereof, and the life of the CCFL 40 is less affected.

The present invention has been illustrated and described in detail by the preferred embodiments thereof, while the above mentioned embodiments of the present invention are described only for an illustrative purpose. It is required to point out that the present invention should not be limited to the disclosed embodiments as illustrated, and that all modifications and alterations which maintain the spirit and realm of the present invention are within the scope as defined in the appended claims.

What is claimed is:

1. A backlight module, comprising a back plate, a reflection plate, a cold cathode fluorescent lamp (CCFL), an optical film, a panel and a front frame, characterized in that:
the backlight module further comprises a heating device, the heating device is disposed between the reflection plate and the CCFL;
wherein the heating device is tightly attached to the CCFL and fixed on the reflection plate; and the backlight module further comprises a temperature control device, the temperature control device comprises a temperature control switch circuit and a plurality of thermocouples, wherein the plurality of thermocouples are installed at a location of the CCFL, the temperature control switch circuit is electrically connected with a power supply apparatus of the heating device.

2. A backlight module, comprising a back plate, a reflection plate, a cold cathode fluorescent lamp (CCFL), an optical film, a panel and a front frame, characterized in that:
the backlight module further comprises a heating device and a temperature control device, the heating device is disposed between the reflection plate and the CCFL, the temperature control device comprises a temperature control switch circuit and a plurality of thermocouples, wherein the plurality of thermocouples are installed at a location of the CCFL, the temperature control switch circuit is electrically connected with a power supply apparatus of the heating device.

3. The backlight module of claim 2, wherein the heating device is a transparent film electrical heater.

4. The backlight module of claim 3, wherein the transparent film electrical heater comprises three layers, wherein upper and lower layers of the three layers are made of transparent insulating material, and a middle layer of the three layers is a carbon fiber heating structure.

5. The backlight module of claim 2, wherein the heating device is tightly attached to the CCFL and fixed onto the reflection plate by adherence.

* * * * *